(12) United States Patent
Chen et al.

(10) Patent No.: US 12,133,020 B1
(45) Date of Patent: Oct. 29, 2024

(54) METHOD AND SYSTEM FOR VERIFYING IMAGE INTERFACE AND IMAGE EQUIPMENT

(71) Applicant: Fulian Precision Electronics (Tianjin) Co., LTD., Tianjin (CN)

(72) Inventors: Chia-Chun Chen, New Taipei (TW); Chien-Hao Su, Taoyuan (TW); Yu-Shan Lin, Taoyuan (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 18/222,509

(22) Filed: Jul. 17, 2023

(30) Foreign Application Priority Data

Jun. 19, 2023 (CN) .......................... 202310727592.6

(51) Int. Cl.
*H04N 17/00* (2006.01)
*H04N 7/035* (2006.01)

(52) U.S. Cl.
CPC ............ *H04N 7/035* (2013.01); *H04N 17/004* (2013.01)

(58) Field of Classification Search
CPC ...... H04N 17/00; H04N 17/002; H04N 17/04; H04N 17/004; H04N 7/035; H04N 21/6473; H04N 21/64738
USPC ...... 348/180, 187, 189, 192; 725/64–68, 98, 725/100, 107, 117, 118, 120, 121, 123, 725/131, 139, 148, 151
See application file for complete search history.

(56) References Cited

U.S. PATENT DOCUMENTS

| | | | | |
|---|---|---|---|---|
| 2004/0218891 A1* | 11/2004 | Clark | ..................... | G06Q 99/00 385/147 |
| 2006/0077259 A1* | 4/2006 | Knoedgen | ............ | H04N 17/002 348/187 |

FOREIGN PATENT DOCUMENTS

| TW | 201005511 A | 2/2010 |
|---|---|---|
| TW | I764587 B | 5/2022 |

* cited by examiner

*Primary Examiner* — Sherrie Hsia
(74) *Attorney, Agent, or Firm* — ScienBiziP, P.C.

(57) ABSTRACT

A method and a system for verifying an image interface, and an image equipment are provided. The system includes a memory, a receiving module, and a transmitting module; the receiving module connected to an image output interface of a device under test (DUT), the transmitting module connected to an image input interface of the DUT. The method includes obtaining at least one predetermined image from the memory, and generating serial data stream according to the at least one predetermined image; controlling the transmitting module to transmit the serial data stream to the image input interface; controlling the receiving module to obtain returned serial data stream from the image output interface; and determining the image interface of the DUT to be normal when the receiving module successfully obtains the returned serial data stream from the image output interface.

18 Claims, 7 Drawing Sheets

METHOD AND SYSTEM FOR VERIFYING IMAGE INTERFACE AND IMAGE EQUIPMENT

CROSS-REFERENCE TO RELATED APPLICATIONS

This application claims priority to Chinese Patent Application No. 202310727592.6 filed on Jun. 19, 2023, in China National Intellectual Property Administration, the contents of which are incorporated by reference herein.

FIELD

The subject matter herein generally relates to image equipment testing technologies, and specially relates to a method and a system for verifying an image interface and an image equipment.

BACKGROUND

In the related technology, when testing an image interface, generally after the image interface is plugged with a camera used for testing or hardware devices are turned off, and then the camera or related hardware devices are run to verify whether the image interface is working normally, so for the image interface, the verifying process is relatively inefficient.

BRIEF DESCRIPTION OF THE DRAWINGS

Implementations of the present disclosure will now be described, by way of example only, with reference to the attached figures.

DETAILED DESCRIPTION

Figure 1:
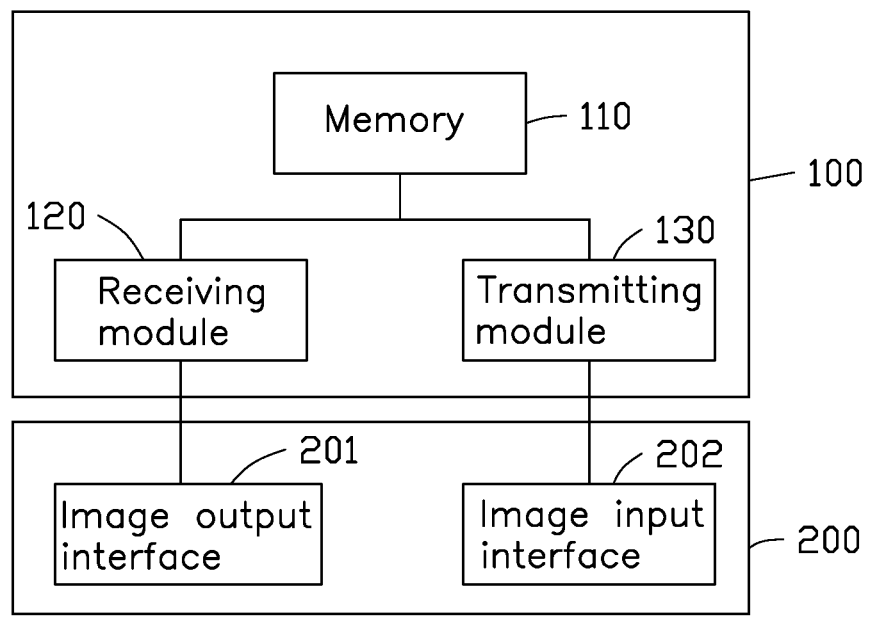
FIG. 1 is a schematic diagram of a first embodiment of a system for verifying an image interface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series, and the like.

At present, an imaging system composed of multiple cameras is widely used in various products, such as a driving assistance system of the car, which is mainly composed of cameras arranged in various positions of the car and the on-vehicle computer, as well as an intelligent monitoring system composed of multiple cameras and computers. The on-vehicle computer, computer and other equipment in the imaging system are all provided with a hardware image interface, and are connected to the cameras and a display module through the image interface, so as to receive the video stream data of the cameras and display it through the display module.

In the related technology, when testing the image interface, generally after the image interface is plugged with the camera used for testing or hardware devices are turned off, and then the camera or related hardware devices are run to verify whether the image interface is working normally, so for the image interface, the verifying process is relatively inefficient.

A method and a system for verifying an image interface and an image equipment are provided, which are configured to improve an efficiency of a verifying process of the image interface.

FIG. 1 illustrates a schematic diagram of a first embodiment of a system for verifying an image interface. The system 100 for verifying the image interface includes a memory 110, a receiving module 120, and a transmitting module 130. The memory 110 is connected to the receiving module 120 and the transmitting module 130. The receiving module 120 is connected to an image output interface 201 of a device under test (DUT) 200. The transmitting module 130 is connected to an image input interface 202 of the DUT 200.

Figure 2:
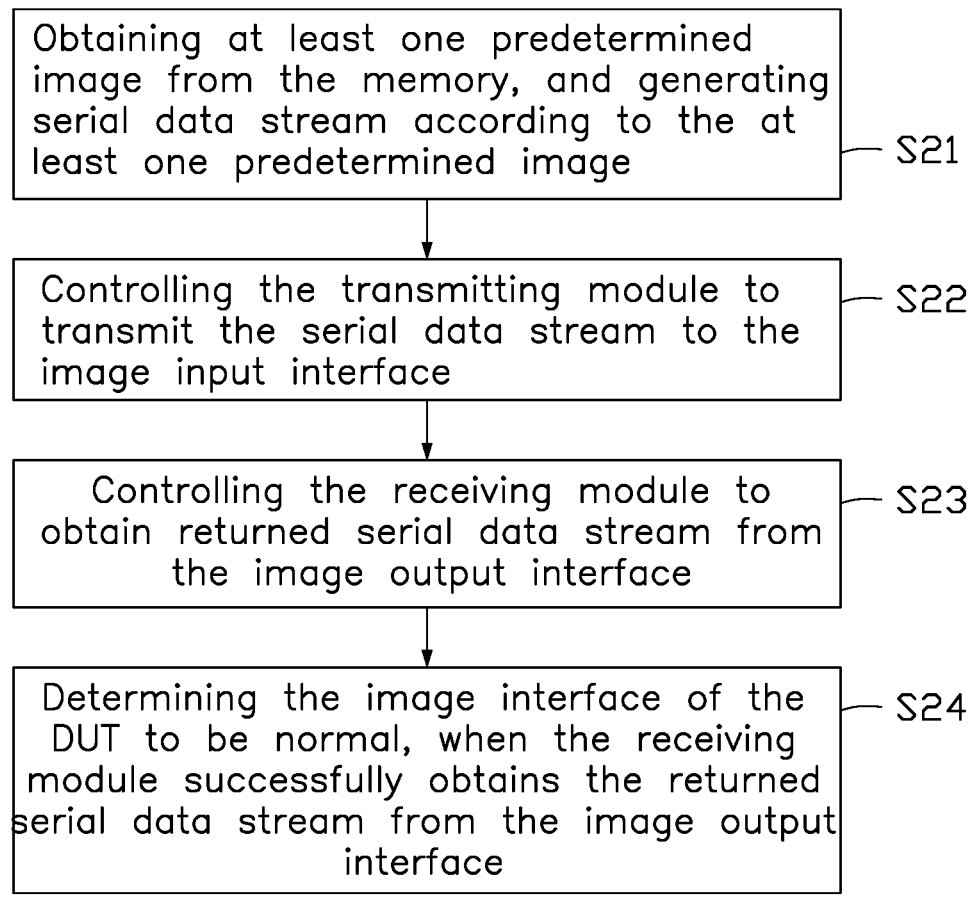
FIG. 2 is a flow chart of an embodiment of a method for verifying the image interface.

FIG. 2 illustrates a flow chart of an embodiment of a method for verifying the image interface, combining the system 100 as shown in FIG. 1. The method may include:

At block S21, obtaining at least one predetermined image from the memory, and generating serial data stream according to the at least one predetermined image.

In at least one embodiment, the system for verifying the image interface may be arranged in an electronic device, which is a device under test (DUT) that can perform the verification to the image interface of the electronic device when the electronic device is activated or receives a verification instruction for the image interface. The system for verifying the image interface may include a controller, which can be a processor of the electronic device. When verifying the image interface, the processor of the electronic device may run applications for executing the method for verifying the image interface of the embodiment.

Otherwise, the system for verifying the image interface may form an independent apparatus for verifying the image interface, each of the transmitting module and the receiving module includes interfaces for connecting an image input interface and an image output interface of the DUT. The system for verifying the image interface may include a controller and a memory. The memory stores applications, the controller runs the applications to execute ting the method for verifying the image interface of the embodiment.

The image input interface and the image output interface of the DUT may include, but not limit to, High Definition Multimedia Interface (HDMI), Digital Visual Interface (DVI), and Video Graphics Array (VGA), etc.

In at least one embodiment, the memory may pre-store various predetermined images, such as predetermined images in different environments and captured by different imaging devices, and network images transmitted by remote devices, which are not limited. When the controller receives the verification instruction for the image interface, the controller may obtain at least one predetermined image from the memory according to the verification instruction for the image interface, perform a Gigabit Multimedia Serial Link (GMSL) serial data processing to generate serial data stream. For instance, when verifying three image output interfaces at the same time, the controller may obtain three predetermined images and perform serial data processing through the verification instruction for the image interface, or a camera device connected to the image input interface, the controller may obtain three predetermined images of the camera device and perform serial data processing through the verification instruction for the image interface, which is not limited.

At block S22, controlling the transmitting module to transmit the serial data stream to the image input interface.

In at least one embodiment, after generating the serial data stream, the controller controls the transmitting module to obtain the serial data stream from the memory and transmit the serial data stream to the image input interface of the DUT. The DUT may be in an activating status when verifying the image interface, after receiving the serial data stream through the image input interface, operating a signal processing to the serial data stream and outputting through the image output interface.

At block S23, controlling the receiving module to obtain returned serial data stream from the image output interface.

In at least one embodiment, when the controller controls the transmitting module to transmit the serial data stream, the controller further controls the receiving module to activate and receive the serial data stream returned from the image output interface of the DUT. The receiving module may wait a predetermined time for receiving the returned serial data stream after activated, which may prevent a mis-determine of verifying the image interface caused by internal data transmission delay in the DUT.

At block S24, determining the image interface of the DUT to be normal, when the receiving module successfully obtains the returned serial data stream from the image output interface.

In at least one embodiment, when the receiving module successfully obtains the returned serial data stream from the image output interface, the controller may determine the image interface of the DUT to be normal; otherwise, determining the image interface of the DUT to be abnormal, the verifying for the image interface fails. The abnormal of the image interface of the DUT may include an abnormal of the image input interface and an abnormal of the image output interface.

In at least one embodiment, the system for verifying the image interface may be arranged in the DUT, the controller may be the processor of the DUT, the controller may control the DUT to activate and operate normally when determining the image interface of the DUT to be normal; the controller may control the DUT to activate and display the interface abnormal information and stop operating when determining the image interface of the DUT to be abnormal.

The system for verifying the image interface includes the memory, the receiving module, and the transmitting module, when verifying the image interface of the DUT, obtaining the predetermined images from the memory, generating the serial data stream and transmitting same to the image input interface of the DUT, so the image interface does not need to plug in camera or related hardware device for testing the image interface during the verifying process, an efficiency of verifying the image interface can be improved. And also, performing the serial data stream processing to the predetermined images may improve a stability and a reliability of the transmission of the predetermined images, so the stability and the reliability of verifying the image interface can be improved.

Figure 3:
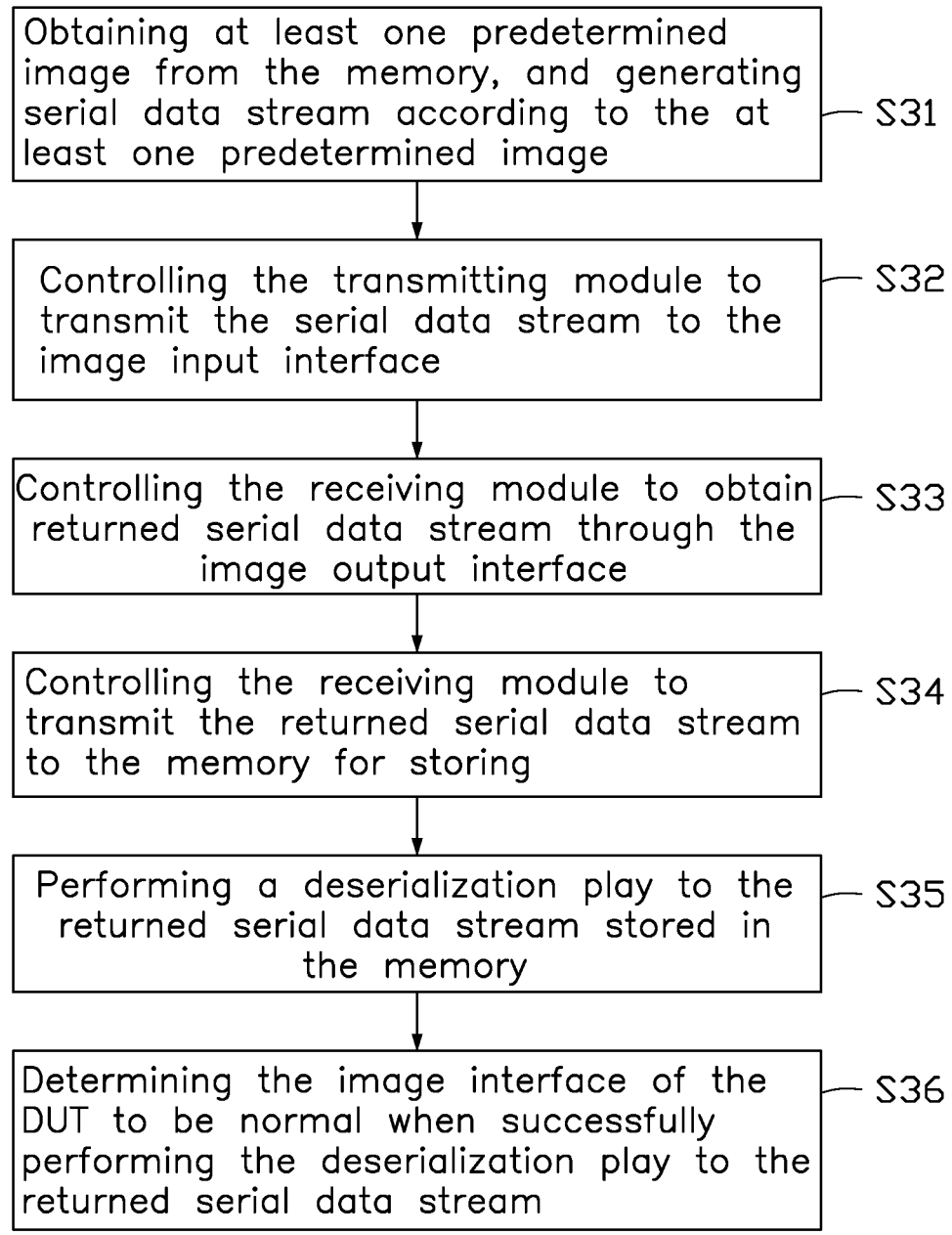
FIG. 3 is a flow chart of a second embodiment of the method for verifying the image interface.

FIG. 3 illustrates a flow chart of a second embodiment of the method for verifying the image interface. The method may include:

At block S31, obtaining at least one predetermined image from the memory, and generating serial data stream according to the at least one predetermined image.

At block S32, controlling the transmitting module to transmit the serial data stream to the image input interface.

At block S33, controlling the receiving module to obtain returned serial data stream through the image output interface.

In at least one embodiment, blocks S31-S33 can be referred to blocks S21-S23, not repeated here.

At block S34, controlling the receiving module to transmit the returned serial data stream to the memory for storing.

In at least one embodiment, after determining the receiving module received the returned serial data stream through the image output interface, the controller controls the receiving module to transmit the returned serial data stream the memory for storing, which is convenient for analyzing the serial data stream stored in the memory, obtaining a result of verifying the image interface of the DUT, and improving a reliability of the result of verifying the image interface.

At block S35, performing a deserialization play to the returned serial data stream stored in the memory.

At block S36, determining the image interface of the DUT to be normal when successfully performing the deserialization play to the returned serial data stream.

In at least one embodiment, the memory further stores an application program of GMSL deserialization play, the controller may run the application program to perform the deserialization play to the returned serial data stream stored in the memory. The controller may determine the image interface of the DUT to be normal when successfully performing the deserialization play to the returned serial data stream. Furthermore, the controller may further determine the image interface of the DUT to be normal when determining an image of the deserialization play is in accord with the predetermined image, so as to further improve the reliability of the result of verifying the image interface.

Figure 4:
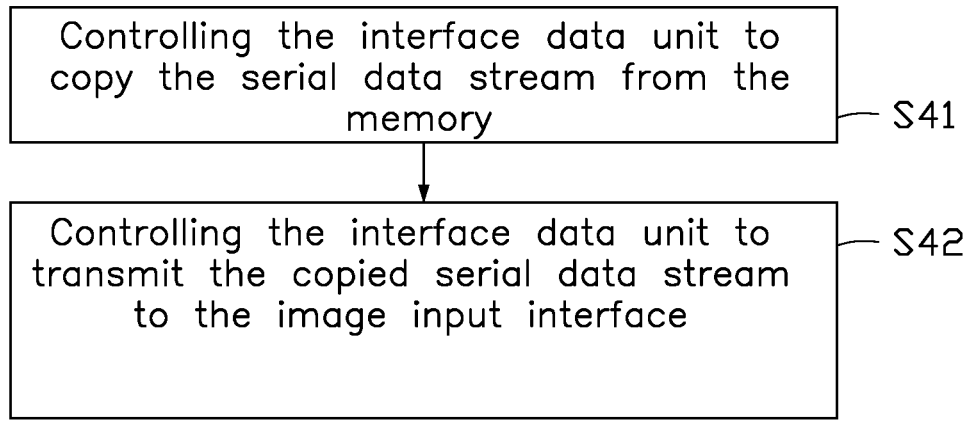
FIG. 4 is a flow chart of an embodiment of a method for transmitting serial data stream.

In at least one embodiment, the transmitting module may include an interface data unit connected to the memory, the interface data unit is further connected to the image input interface of the DUT. FIG. 4 illustrates a flow chart of an embodiment of a method for transmitting serial data stream, controlling the transmitting module to transmit the serial data stream to the image input interface, includes:

At block S41, controlling the interface data unit to copy the serial data stream from the memory.

At block S42, controlling the interface data unit to transmit the copied serial data stream to the image input interface.

In at least one embodiment, when transmitting the serial data stream to the image input interface, the controller may control the interface data unit (IDU) to copy the serial data stream from the memory for transmitting to the image input interface.

Figure 5:
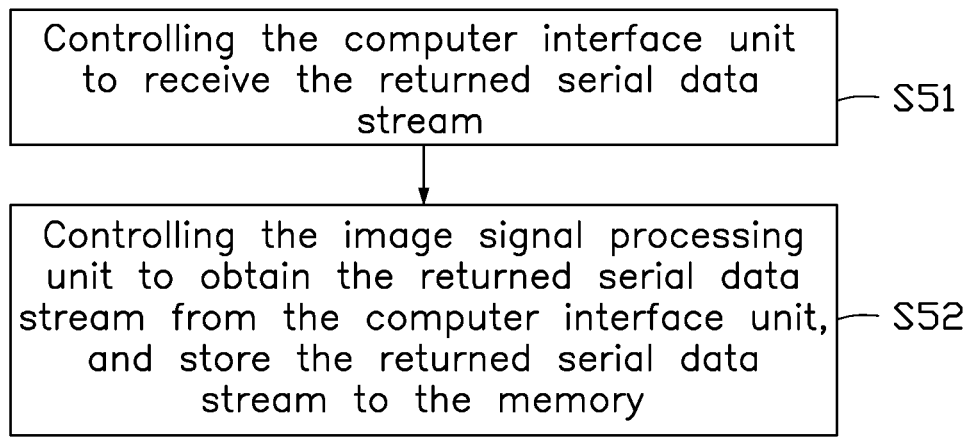
FIG. 5 is a flow chart of an embodiment of a method for receiving returned serial data stream.

In at least one embodiment, the receiving module may include a computer interface unit and an image signal processing unit. The image signal processing unit is connected to the memory, the computer interface unit is connected to the image signal processing unit, the computer interface unit is further connected to the image output interface of the DUT. FIG. 5 illustrates a flow chart of an embodiment of a method for receiving returned serial data stream, controlling the receiving module to obtain returned serial data stream through the image output interface, may include:

At block S51, controlling the computer interface unit to receive the returned serial data stream.

At block S52, controlling the image signal processing unit to obtain the returned serial data stream from the computer interface unit, and store the returned serial data stream to the memory.

In at least one embodiment, the computer interface unit may be a computer interface module (CIM), the image signal processing unit may be abbreviated as ISP unit.

In at least one embodiment, the receiving module may include a direct memory access (DMA) unit connected to the memory, the DMA unit is further connected to the image output interface of the DUT. Controlling the receiving module to obtain returned serial data stream through the image output interface, may include: controlling the DMA unit to receive the returned serial data stream and store the returned serial data stream to the memory.

Figure 6:
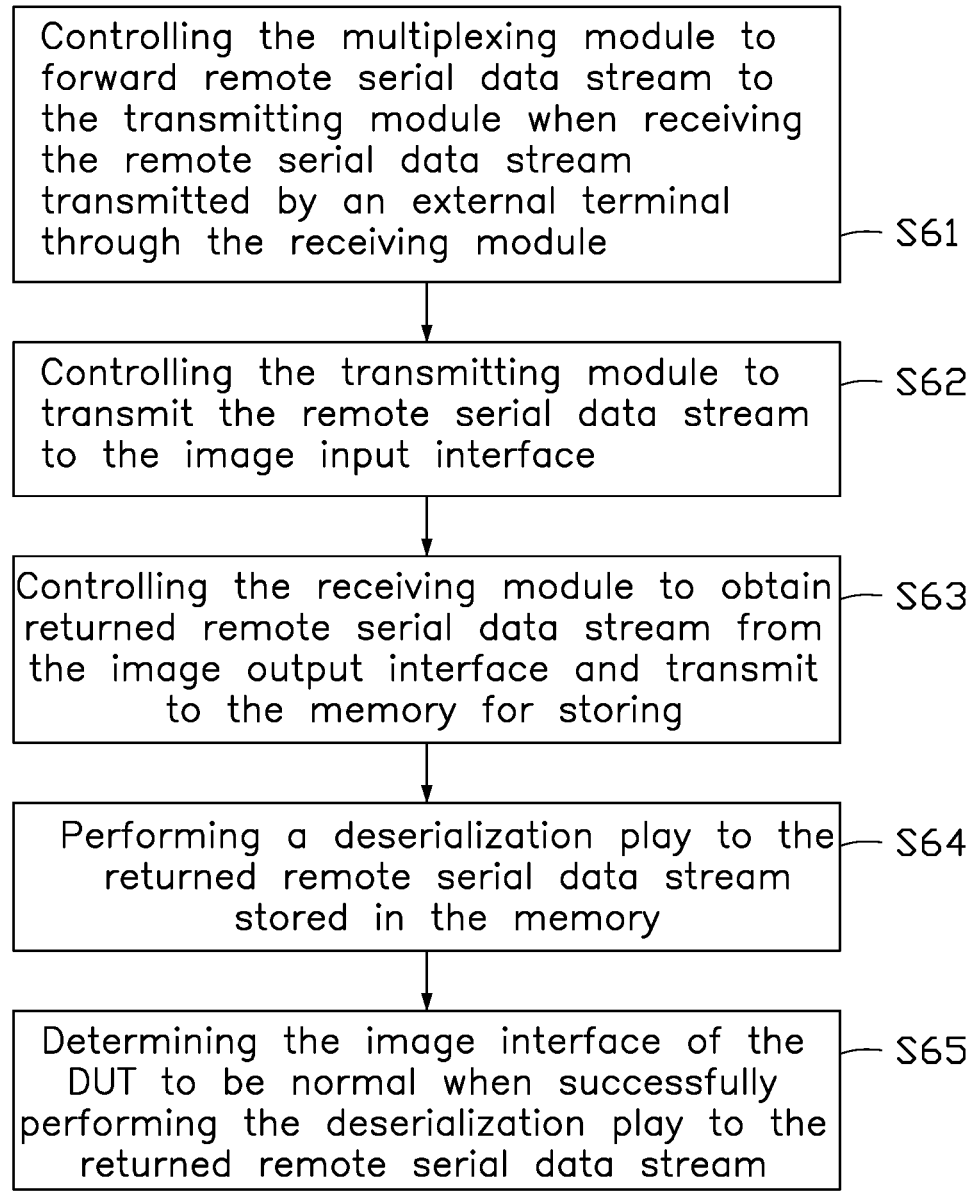
FIG. 6 is a flow chart of a third embodiment of the method for verifying the image interface.

In at least one embodiment, the system for verifying the image interface may include a multiplexing module connected to the transmitting module and the receiving module. FIG. 6 illustrates a flow chart of a third embodiment of the method for verifying the image interface. The method may include:

At block S61, controlling the multiplexing module to forward remote serial data stream to the transmitting module when receiving the remote serial data stream transmitted by an external terminal through the receiving module.

In at least one embodiment, the external terminal includes electronic devices connected to the system for verifying the image interface through remote communication, such as personal computer, tablet computer, and laptop computer, etc. The system for verifying the image interface may verify the image interface using the remote serial data stream after received the remote serial data stream.

At block S62, controlling the transmitting module to transmit the remote serial data stream to the image input interface.

In at least one embodiment, the controller controls the multiplexing module to transmit the remote serial data stream to the transmitting module, and controls the transmitting module to transmit the remote serial data stream to the image input interface.

At block S63, controlling the receiving module to obtain returned remote serial data stream from the image output interface and transmit to the memory for storing.

At block S64, performing a deserialization play to the returned remote serial data stream stored in the memory.

At block S65, determining the image interface of the DUT to be normal when successfully performing the deserialization play to the returned remote serial data stream.

In at least one embodiment, the processes of verifying the image interface using the remote serial data stream is similar to the processes of verifying the image interface using the serial data stream generated by the predetermined image, not repeated here.

Figure 7:
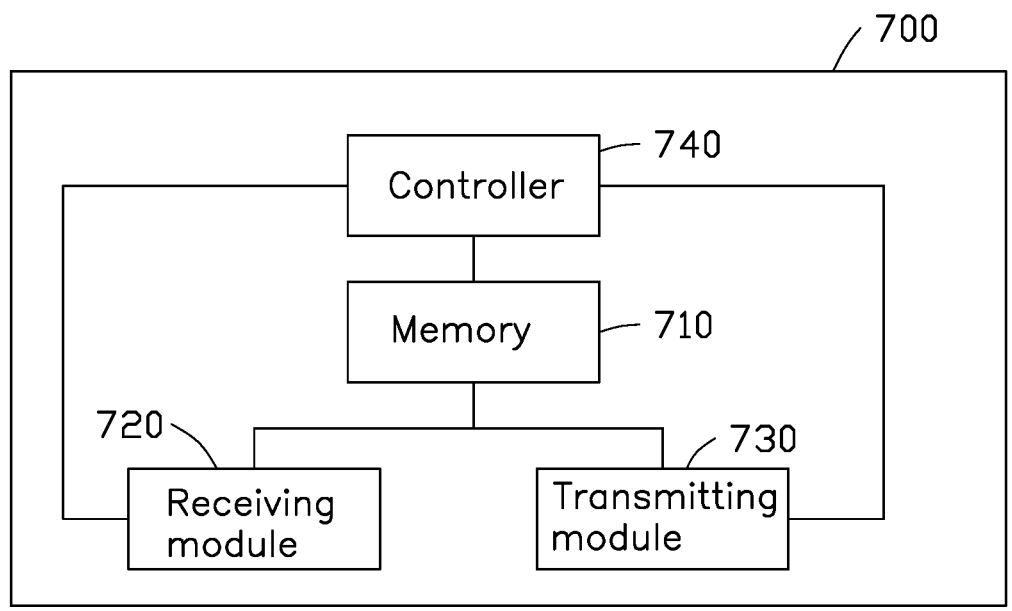
FIG. 7 is a schematic diagram of an embodiment of a system for verifying the image interface.

FIG. 7 illustrates a schematic diagram of an embodiment of the system for verifying the image interface. The system 700 for verifying the image interface may include a memory 710, a receiving module 720, a transmitting module 730, and a controller 740.

The memory 710 is connected to the receiving module 720 and the transmitting module 730. The receiving module 720 is connected to the image output interface of the DUT. The transmitting module 730 is connected to the image input interface of the DUT.

The controller 740 is configured to obtain at least one predetermined image from the memory 710, generate serial data stream according to the at least one predetermined image, control the transmitting module 730 to transmit the serial data stream to the image input interface, control the receiving module 720 to obtain returned serial data stream through the image output interface, determining the image interface of the DUT to be normal, when the receiving module 720 successfully obtains the returned serial data stream from the image output interface.

In at least one embodiment, after controlling the receiving module 720 to obtain returned serial data stream through the image output interface, the controller 740 is further configured to control the receiving module 720 to transmit the returned serial data stream the memory for storing, perform the deserialization play to the returned serial data stream stored in the memory 710, and determine the image interface of the DUT to be normal when successfully performing the deserialization play to the returned serial data stream.

Figure 8:
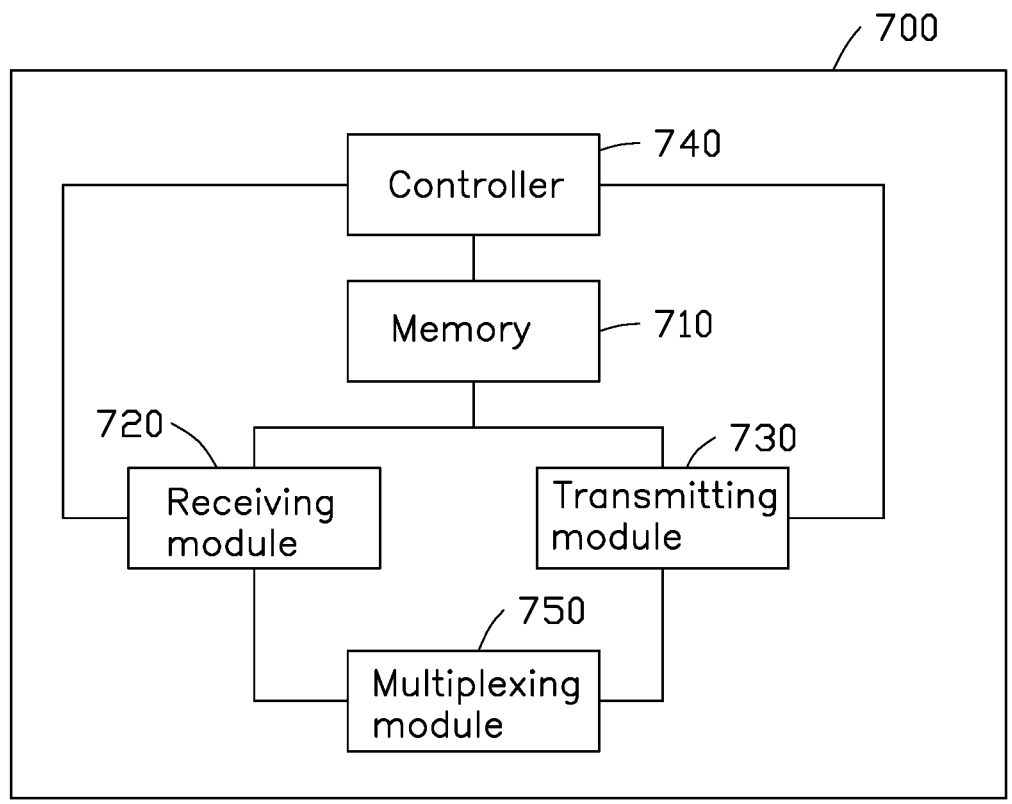
FIG. 8 is a schematic diagram of another embodiment of the system for verifying the image interface.

FIG. 8 illustrates a schematic diagram of another embodiment of the system for verifying the image interface. The system 700 for verifying the image interface further includes a multiplexing module 750 connected to the transmitting module 730 and the receiving module 720. The controller is further configured to control the multiplexing module 750 to forward the remote serial data stream to the transmitting module 730 when receiving the remote serial data stream transmitted by an external terminal through the receiving module 720, control the transmitting module 730 to transmit the remote serial data stream to the image input interface, control the receiving module 720 to obtain returned remote serial data stream from the image output interface and transmit to the memory 710 for storing, perform the deserialization play to the returned remote serial data stream stored in the memory 710, and determine the image interface of the DUT to be normal when successfully performing the deserialization play to the returned remote serial data stream.

An image equipment according to an embodiment of the present application is also provided, the image equipment includes the image output interface, the image input interface, and the system for verifying the image interface according to any embodiments.

Beneficial effects of the system for verifying the image interface may be referred to beneficial effects of the method for verifying the image interface described above, not repeating here.

A non-transitory computer-readable storage medium including program instructions for causing the computer apparatus (such as personal computer, device, or network device, etc.) or the processor to perform the method for verifying the image interface is also disclosed.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for verifying an image interface applied in a system for verifying the image interface, the system is provided with a memory, a receiving module, and a transmitting module; the memory connected to the receiving module and the transmitting module, the receiving module connected to an image output interface of a device under test (DUT), the transmitting module connected to an image input interface of the DUT; the method comprising:
    obtaining at least one predetermined image from the memory, and generating serial data stream according to the at least one predetermined image;
    controlling the transmitting module to transmit the serial data stream to the image input interface;
    controlling the receiving module to obtain returned serial data stream from the image output interface; and
    determining the image interface of the DUT to be normal when the receiving module successfully obtains the returned serial data stream from the image output interface.

2. The method of claim 1, wherein after controlling the receiving module to obtain the returned serial data stream from the image output interface, the method further comprises:
    controlling the receiving module to transmit the returned serial data stream to the memory for storing;
    performing a deserialization play to the returned serial data stream stored in the memory; and
    determining the image interface of the DUT to be normal when successfully performing the deserialization play to the returned serial data stream.

3. The method of claim 1, wherein the transmitting module is provided with an interface data unit, controlling the transmitting module to transmit the serial data stream to the image input interface further comprises:
    controlling the interface data unit to copy the serial data stream from the memory; and
    controlling the interface data unit to transmit the copied serial data stream to the image input interface.

4. The method of claim 1, wherein the receiving module is further provided with a computer interface unit and an image signal processing unit, controlling the receiving module to obtain the returned serial data stream from the image output interface further comprises:
    controlling the computer interface unit to receive the returned serial data stream; and
    controlling the image signal processing unit to obtain the returned serial data stream from the computer interface unit and store the returned serial data stream to the memory.

5. The method of claim 1, wherein the receiving module is further provided with a direct memory access (DMA) unit, controlling the receiving module to obtain the returned serial data stream from the image output interface further comprises:
    controlling the DMA unit to receive the returned serial data stream and store the returned serial data stream to the memory.

6. The method of claim 1, wherein the system is further provided with a multiplexing module connected to the transmitting module and the receiving module, the method further comprises:
    controlling the multiplexing module to forward remote serial data stream to the transmitting module when receiving the remote serial data stream transmitted by an external terminal through the receiving module;
    controlling the transmitting module to transmit the remote serial data stream to the image input interface;
    controlling the receiving module to obtain returned remote serial data stream from the image output interface and transmit to the memory for storing;
    performing a deserialization play to the returned remote serial data stream stored in the memory; and
    determining the image interface of the DUT to be normal when successfully performing the deserialization play to the returned remote serial data stream.

7. A system for verifying an image interface comprising a memory, a receiving module, a transmitting module, and a controller; the memory connected to the receiving module and the transmitting module, the receiving module connected to an image output interface of a device under test (DUT), the transmitting module connected to an image input interface of the DUT; the controller is configured to:
    obtain at least one predetermined image from the memory, and generate serial data stream according to the at least one predetermined image;
    control the transmitting module to transmit the serial data stream to the image input interface;
    control the receiving module to obtain returned serial data stream from the image output interface; and
    determine the image interface of the DUT to be normal when the receiving module successfully obtains the returned serial data stream from the image output interface.

8. The system of claim 7, wherein after the controller controls the receiving module to obtain the returned serial data stream from the image output interface, the controller is further configured to:
control the receiving module to transmit the returned serial data stream to the memory for storing;
perform a deserialization play to the returned serial data stream stored in the memory; and
determine the image interface of the DUT to be normal when successfully performing the deserialization play to the returned serial data stream.

9. The system of claim 7, wherein the transmitting module comprises an interface data unit, for the controller controls the transmitting module to transmit the serial data stream to the image input interface, the controller is further configured to:
control the interface data unit to copy the serial data stream from the memory; and
control the interface data unit to transmit the copied serial data stream to the image input interface.

10. The system of claim 7, wherein the receiving module comprises a computer interface unit and an image signal processing unit, for the controller controls the receiving module to obtain the returned serial data stream from the image output interface, the controller is further configured to:
control the computer interface unit to receive the returned serial data stream; and
control the image signal processing unit to obtain the returned serial data stream from the computer interface unit and store the returned serial data stream to the memory.

11. The system of claim 7, wherein the receiving module is further provided with a direct memory access (DMA) unit, for the controller controls the receiving module to obtain the returned serial data stream from the image output interface, the controller is further configured to:
control the DMA unit to receive the returned serial data stream and store the returned serial data stream to the memory.

12. The system of claim 7, further comprising a multiplexing module connected to the transmitting module and the receiving module, wherein the controller is further configured to:
control the multiplexing module to forward remote serial data stream to the transmitting module when receiving the remote serial data stream transmitted by an external terminal through the receiving module;
control the transmitting module to transmit the remote serial data stream to the image input interface;
control the receiving module to obtain returned remote serial data stream from the image output interface and transmit to the memory for storing;
perform a deserialization play to the returned remote serial data stream stored in the memory; and
determine the image interface of the DUT to be normal when successfully performing the deserialization play to the returned remote serial data stream.

13. An image equipment comprising:
an image output interface;
an image input interface, and
a system for verifying an image interface, the system comprising a memory, a receiving module, a transmitting module, and a controller; the memory connected to the receiving module and the transmitting module, the receiving module connected to an image output interface of a device under test (DUT), the transmitting module connected to an image input interface of the DUT; the controller is configured to:
obtain at least one predetermined image from the memory, and generate serial data stream according to the at least one predetermined image;
control the transmitting module to transmit the serial data stream to the image input interface;
control the receiving module to obtain returned serial data stream from the image output interface; and
determine the image interface of the DUT to be normal when the receiving module successfully obtains the returned serial data stream from the image output interface.

14. The image equipment of claim 13, wherein after the controller controls the receiving module to obtain the returned serial data stream from the image output interface, the controller is further configured to:
control the receiving module to transmit the returned serial data stream to the memory for storing;
perform a deserialization play to the returned serial data stream stored in the memory; and
determine the image interface of the DUT to be normal when successfully performing the deserialization play to the returned serial data stream.

15. The image equipment of claim 13, wherein the transmitting module comprises an interface data unit, for the controller controls the transmitting module to transmit the serial data stream to the image input interface, the controller is further configured to:
control the interface data unit to copy the serial data stream from the memory; and
control the interface data unit to transmit the copied serial data stream to the image input interface.

16. The image equipment of claim 13, wherein the receiving module comprises a computer interface unit and an image signal processing unit, for the controller controls the receiving module to obtain the returned serial data stream from the image output interface, the controller is further configured to:
control the computer interface unit to receive the returned serial data stream; and
control the image signal processing unit to obtain the returned serial data stream from the computer interface unit and store the returned serial data stream to the memory.

17. The image equipment of claim 13, wherein the receiving module is further provided with a direct memory access (DMA) unit, for the controller controls the receiving module to obtain the returned serial data stream from the image output interface, the controller is further configured to:
control the DMA unit to receive the returned serial data stream and store the returned serial data stream to the memory.

18. The image equipment of claim 13, wherein the system further comprises a multiplexing module connected to the transmitting module and the receiving module, the controller is further configured to:
control the multiplexing module to forward remote serial data stream to the transmitting module when receiving the remote serial data stream transmitted by an external terminal through the receiving module;
control the transmitting module to transmit the remote serial data stream to the image input interface;
control the receiving module to obtain returned remote serial data stream from the image output interface and transmit to the memory for storing;

perform a deserialization play to the returned remote serial data stream stored in the memory; and determine the image interface of the DUT to be normal when successfully performing the deserialization play to the returned remote serial data stream.

\* \* \* \* \*